United States Patent
Mullins

(10) Patent No.: US 7,518,520 B2
(45) Date of Patent: Apr. 14, 2009

(54) RFID READER HAVING ANTENNA WITH DIRECTIONAL ATTENUATION PANELS FOR DETERMINING RFID TAG LOCATION

(75) Inventor: Philip Kendal Mullins, Richmond, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 11/875,172

(22) Filed: Oct. 19, 2007

(65) Prior Publication Data

US 2008/0036602 A1 Feb. 14, 2008

Related U.S. Application Data

(63) Continuation of application No. 11/196,116, filed on Aug. 2, 2005, now Pat. No. 7,323,996.

(51) Int. Cl.
G08B 13/14 (2006.01)
(52) U.S. Cl. ............... 340/572.7; 340/572.4; 340/572.1
(58) Field of Classification Search .............. 340/572.1, 340/572.4, 572.7, 572.8, 539.1, 539.21, 693.5, 340/10.1; 235/449, 451, 492; 343/874
See application file for complete search history.

(56) References Cited

U.S. PATENT DOCUMENTS

| | | | |
|---|---|---|---|
| 5,995,015 A | 11/1999 | DeTemple et al. | |
| 6,204,765 B1 | 3/2001 | Brady et al. | |
| 6,297,639 B1 | 10/2001 | Clark et al. | |
| 6,307,473 B1 | 10/2001 | Zampini et al. | |
| 6,566,881 B2 | 5/2003 | Omeragic et al. | |
| 6,577,238 B1 | 6/2003 | Whitesmith et al. | |
| 6,869,019 B1 | 3/2005 | Nagi et al. | |
| 7,036,734 B2 | 5/2006 | Baker | |
| 2006/0187060 A1* | 8/2006 | Colby | 340/572.8 |
| 2006/0254815 A1* | 11/2006 | Humphrey et al. | 174/380 |
| 2007/0222582 A1* | 9/2007 | Fontijn | 340/539.1 |

FOREIGN PATENT DOCUMENTS

JP 56000717 A 1/1981
JP 2003-264417 9/2003

* cited by examiner

Primary Examiner—Van T. Trieu
(74) Attorney, Agent, or Firm—Whitman, Curtis, Christofferson & Cook, PC; William E. Schiesser

(57) ABSTRACT

An antenna structure capable of determining the direction of a radiofrequency identification (RFID) tag includes a wide-angle antenna disposed within an attenuator that has regions of low attenuation. The attenuator may include a metal plate with holes. In this case, the antenna only detects RFID tags that are aligned with a hole, and hence the direction of the RFID tag is detected. Multiple holes of different sizes can be provided. In this case, if the RFID tag is moving, the direction and speed of movement can be determined from the duration of received RFID signals. For example, a long period of RFID tag signal reception indicates that the tag passed in front of a large hole in the attenuator. The present invention is particularly well suited for use with conveyor belts and in applications where RFID tags move along known paths.

3 Claims, 4 Drawing Sheets

RFID READER HAVING ANTENNA WITH DIRECTIONAL ATTENUATION PANELS FOR DETERMINING RFID TAG LOCATION

CROSS-REFERENCE TO RELATED APPLICATIONS

This application is a continuation of U.S. patent application Ser. No. 11/196,116, filed Aug. 2, 2005, now U.S. Pat. No. 7,323,996 assigned to the assignee of the present application, the content of which is hereby fully incorporated by reference.

FIELD OF THE INVENTION

The present invention relates generally to methods for locating radio frequency identification (RFID) tags. More specifically, the present invention relates to an antenna structure with shielding elements that allow determination of the direction to the RFID tag.

BACKGROUND OF THE INVENTION

Radio frequency identification (RFID) tags are small electronic circuits that provide identifying information in a manner akin to barcodes. RFID tags are becoming ubiquitous in many manufacturing, shipping and warehousing applications.

In operation, RFID tags are queried by an electromagnetic RF pulse of a certain frequency. After reception of the RF pulse, the RFID tag responds with an RF pulse containing encoded information. Typically, the encoded information identifies an object or merchandise associated with the RFID tag.

In many applications, it is important to determine the location or direction of motion of an RFID tag. For example, if an RFID tag is attached to a box moving on a conveyor belt, it may be necessary to determine if the box has passed a certain location, or determine where the box is moving. In conventional RFID tag reader systems, RFID tag location is typically determined by querying the tag with multiple directional antennas that each read in a different direction. This method is effective, but relatively expensive to implement as a result of the multiple antennas and electronics required. Other methods for locating RFID tags may employ multiple readers sharing reception data via a wireless network.

It would be an advance in the art of RFID reader technology to provide a single-antenna structure for determining the location and movement direction of RFID tags. A single-antenna RFID tag locator would reduce the cost of tag-locating RFID readers, and could be widely used in object-tracking applications.

SUMMARY OF THE INVENTION

The present invention includes an antenna structure for locating a radiofrequency identification (RFID) tag. The antenna structure includes a wide angle antenna, and an attenuator surrounding the antenna. The attenuator has at least one area of reduced attenuation that defines a detection region extending from the antenna. The area of reduced attenuation has dimensions of at least $0.5\lambda$, wherein $\lambda$ is a wavelength of radiation transmitted by the RFID tag. In other embodiments, the area of reduced attenuation is larger than $0.5\lambda$.

The antenna can be a dipole antenna or other wide-angle antenna.

The attenuator can comprise 2 or more areas of reduced attenuation. The areas may be different sizes. The areas may provide essentially zero attenuation.

The attenuator may comprise a metal sheet with holes comprising the areas of reduced attenuation.

Also, the attenuator or the areas of reduced attenuation may comprise a metal screen.

The present invention also includes a system for detecting RFID tags moving along a known pathway such as a conveyor belt. In this embodiment, the area of reduced attenuation is disposed in relation to the antenna such that radiofrequency communication is possible between an RFID tag on the pathway and the antenna.

The present invention is particularly well suited for use in detecting tags moving along a known pathway.

DETAILED DESCRIPTION OF THE PREFERRED EMBODIMENTS OF THE INVENTION

The present invention provides an antenna structure and method for determining the location of a radio frequency identification (RFID) tag. The antenna structure comprises a conventional wide-angle antenna (e.g., a dipole antenna) surrounded by a non-uniform attenuator (e.g., sheet metal plate with holes). The attenuator may completely block or partially block the RFID tag signal in certain directions. The attenuator has windows (openings) that allow the RFID tag signal to pass through the attenuator. The antenna can detect the RFID tag signal only when the RFID tag is aligned with a window. In this way, the antenna can determine that the tag is located at one or one of several angular positions aligned with a window. If the RFID tag is traveling along a known pathway (e.g., along a road, train track, part carrying track, or conveyor belt) then the RFID tag position can be further defined. If the RFID tag passes in front of several windows having different sizes and angular positions, then the speed and direction of the tag can be determined from the number and timing of RFID return signals.

Figure 1:
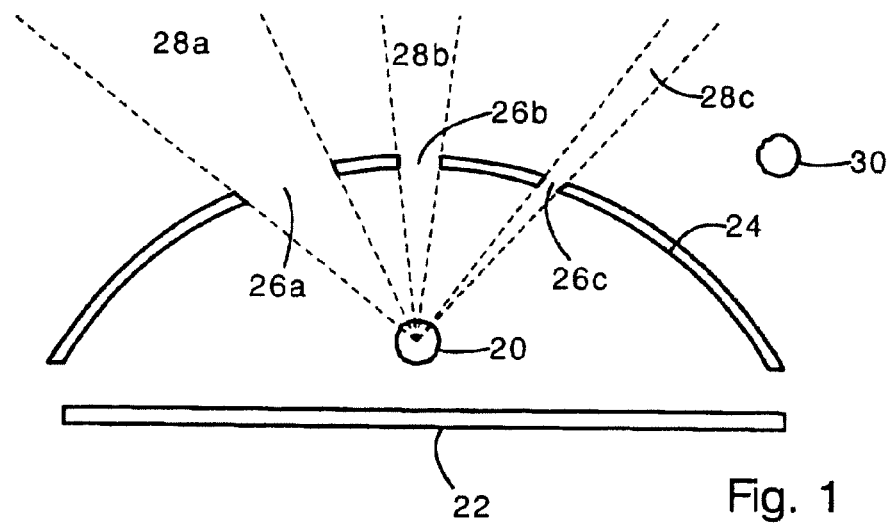
FIG. 1 shows an RFID tag locator according to the present invention.

FIG. 1 shows an antenna structure according to an embodiment of the present invention. The antenna structure comprises a vertical dipole antenna 20. The dipole antenna is vertically oriented (i.e., perpendicular to the page) so that it radiates in the plane of the page. A ground plane 22 is disposed on one side of the dipole antenna. A spatially non-uniform attenuator 24 is disposed opposite the ground plane 22. The ground plane 22 limits the radiation pattern of the dipole antenna 20 so that it radiates only in the direction of the attenuator.

The dipole antenna 20, ground plane 22 and attenuator 24 are seen edge-on in the top view of FIG. 1. The dipole antenna 20, ground plane 22 and attenuator 24 extend in the direction perpendicular to the page.

The dipole antenna 20 can be designed to receive signals from RFID tags at the standards frequencies of 900 Mhz, 2.4 Ghz or other frequencies.

The ground plane 22 can be a metal plate as known in the art.

The attenuator 24 has windows 26a 26b 26c (i.e. areas of reduced attenuation). Preferably, each of the windows 26a 26b 26c has a different size. The windows can be round or rectangular holes, or elongated slits, for example. The attenuator 24 can be a metal sheet or foil that completely blocks (e.g. absorbs or reflects) signals from RFID tags except in the windows 26a 26b 26c. The windows 26a 26b 26c define RFID detection regions 28a 28b 28c, as indicated by dotted lines. The RFID detection regions 28a 28b 28c will typically extend several feet or tens of feet from the antenna, depending on the type of RFID tag being detected (e.g. active or passive).

It is noted that the shape of the detection regions 28a 28b 28c will be influenced by diffraction effects. Hence, the detection regions 28a 28b 28c may not have precisely defined boundaries. The detection regions 28a 28b 28c will have more accurately defined boundaries for RFID systems operating at high frequencies. For this reason, higher frequency RFID systems (e.g., 2.4. Ghz and higher) are generally preferred in the invention.

The shape of the detection regions 28a 28b 28c will also depend upon the size of the windows 26a 26b 26c. Large windows will tend to decrease diffraction effects, as known in the art. Preferably, the windows have minimum dimensions of 0.25, 0.5, 1, or 2 times the wavelength of the RF pulses transmitted by the antenna 20 or received by the antenna. A large hole size in relation to wavelength is preferred in the invention because it tends to create more accurately and predictable RFID detection regions 28a 28b 28c.

In the present invention, the antenna 20 can be a combination transmission/reception antenna, or only a reception antenna. If the antenna 20 only performs reception, an additional auxiliary transmission antenna 30 should be provided. In this case, the auxiliary transmission antenna 30 must transmit over an area overlapping with the detection regions 28a 28b 28c.

Figure 2:
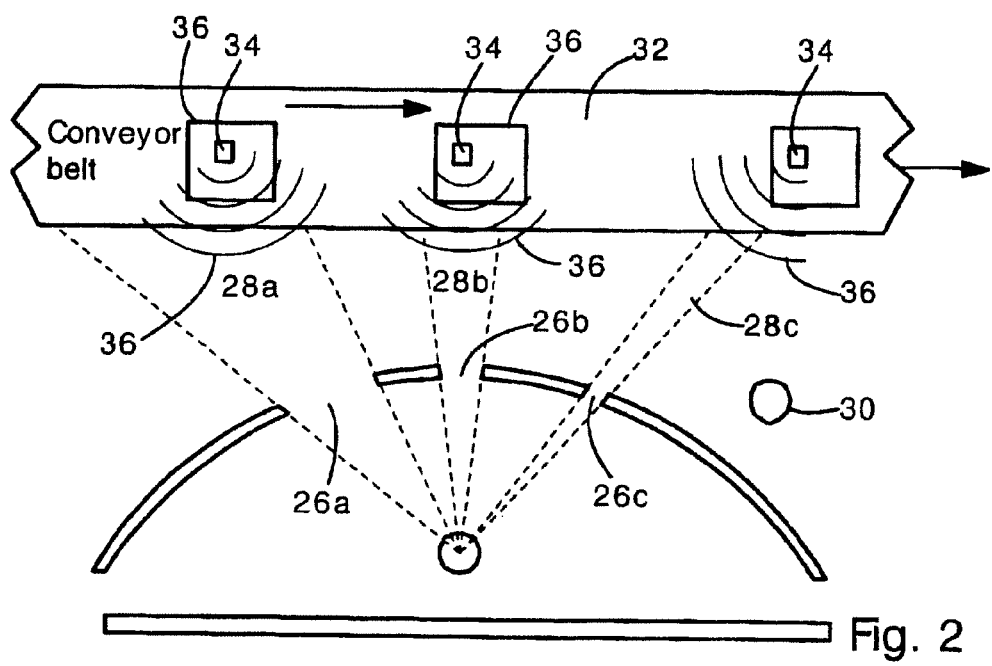
FIG. 2 shows the RFID tag locator in operation reading tags moving on a conveyor belt.

FIG. 2 illustrates the present antenna structure in operation reading RFID tags 34 traveling along a conveyor belt 32. The RFID tags 34 are disposed on containers 36 traveling along the conveyor belt 32. The RFID tags 34 emit RF pulses 36 in response to interrogation signals from the dipole antenna 20 or from the auxiliary antenna 30. The RF response pulses 36 are received by the dipole antenna 20 when the RFID tags 34 move through the detection regions 28a 28b 28c. Hence, when RFID response pulses 36 are received by the dipole antenna, it is known that an RFID tag is located within one of the detection regions 28a 28b 28c.

Figure 3A:
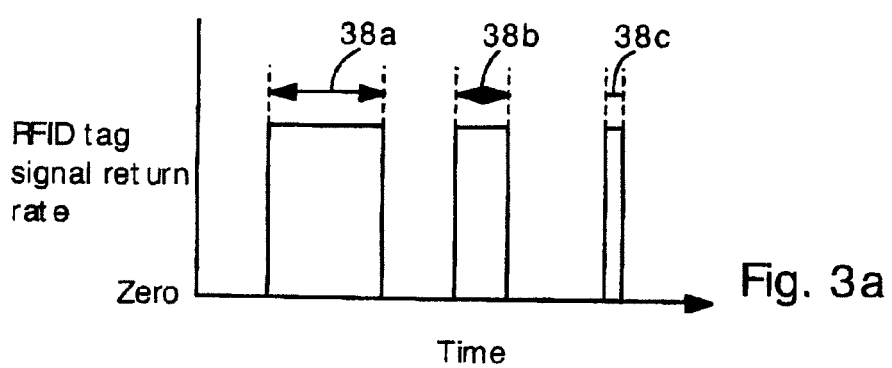
FIG. 3*a* illustrates the RFID tag signals received from the tags in FIG. 2 when the conveyor belt moves from left to right.

FIG. 3a shows a graph of RFID tag signal return rate versus time for a single RFID tag 34 moving along the conveyor belt 32 at a constant speed. The RFID tag signal is received during intervals 38a 38b 38c. Intervals 38a 38b 38c occur when the RFID tag 34 is aligned with windows 26a 26b 26c. Hence, the large window 26a produces a long interval 38a of RFID tag signal reception, and the small window 26c produces a short interval 26c of RFID tag signal reception. With proper calibration, the duration of the intervals 38a 38b 38c can be used to determine the speed of the conveyor belt. Interpolation between the intervals 38a 38b 38c can be used to determine the position of the RFID tag 34 on the conveyor belt.

Figure 3B:
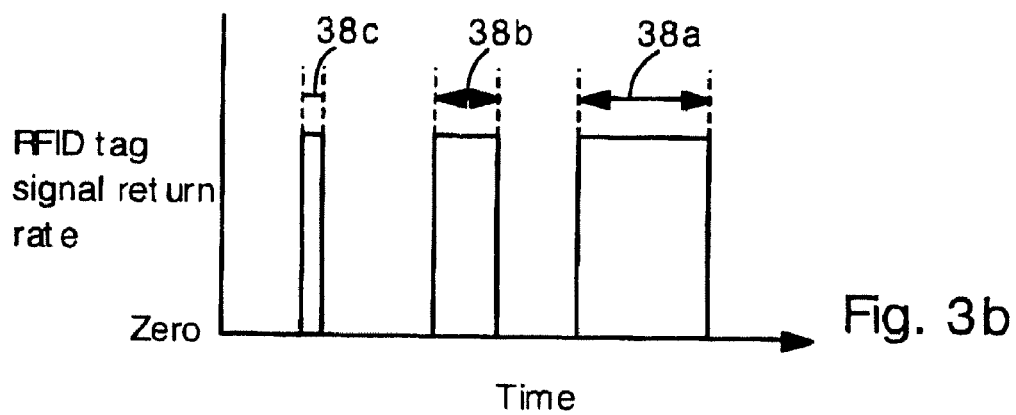
FIG. 3*b* illustrates the RFID tag signals received from the tags in FIG. 2 when the conveyor belt moves from right to left.

Additionally, the direction of the RFID tag 34 movement can be determined from the RFID tag signals. Specifically, since the long interval 38a occurs before the short interval 38c in FIG. 3a, it is known that the RFID tag 34 is moving from left to right. For example, FIG. 3b shows a plot of RFID tag signal return rate for the case of an RFID tag moving from right to left on the conveyor belt 32.

It is important to note that the speed of an RFID tag can be determined if the attenuator 24 has only one window 26, and the RFID tag is moving along a known path. In this case, the speed is determined by the duration of an interval 38. A short interval indicates high speed movement; a long interval indicates low speed movement.

In order to determine RFID tag speed and position accurately, it is best to calibrate the antenna system with independently determined speed and position information.

Figure 4:
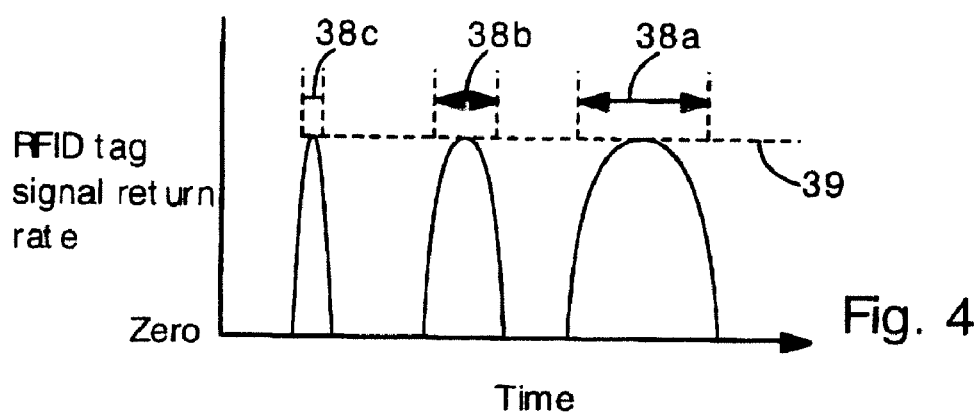
FIG. 4 illustrates that the RFID tag signal return rate can drop gradually as the RFID tag approaches the edge of a window.

The RFID tag signal return rate is a measure of the strength of the RFID tag signal. When communication is robust (e.g. the RFID tag is in close proximity to the transmission and reception antennas) the return rate can be high (e.g. 50-100 hertz). When communication is poor or partially blocked, the return rate can be slower (e.g. 10-25 hertz). For this reason, in some applications, the RFID tag signal return rate may resemble the plot shown in FIG. 4. When the intervals 38a 38b 38c appear as in FIG. 4, and do not have sharp boundaries, it may be necessary to establish threshold values for the return rate that are used to determine the intervals 38a 38b 38c. The maximum RFID tag signal return rate 39 can be used to estimate the distance to the RFID tag 34.

Figure 5:
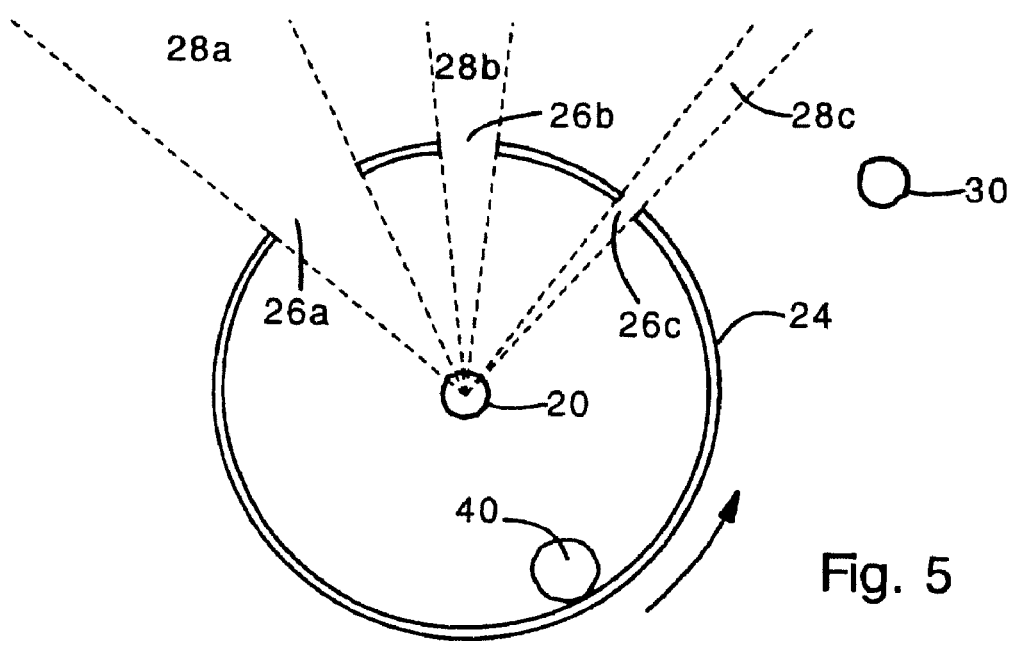
FIG. 5 shows an embodiment in which the attenuator is movable.

FIG. 5 illustrates another aspect of the invention in which the attenuator 24 is moving. The moving attenuator 24 may be rotated with a stepper motor 40. The position of the attenuator 24 can be monitored by the stepper motor or other monitoring device, such as an optical encoder. FIG. 5 illustrates the moving attenuator 24 rotating in a counter-clockwise direction. The moving attenuator 24 will cause the detection regions 26a 26b 26c to rotate through space. Since the position of the moving attenuator 24 is monitored, the position of the detection regions 28a 28b 28c is known. Hence, the position, speed and movement direction of the RFID tag can be determined from the moving attenuator position information.

Figure 6:
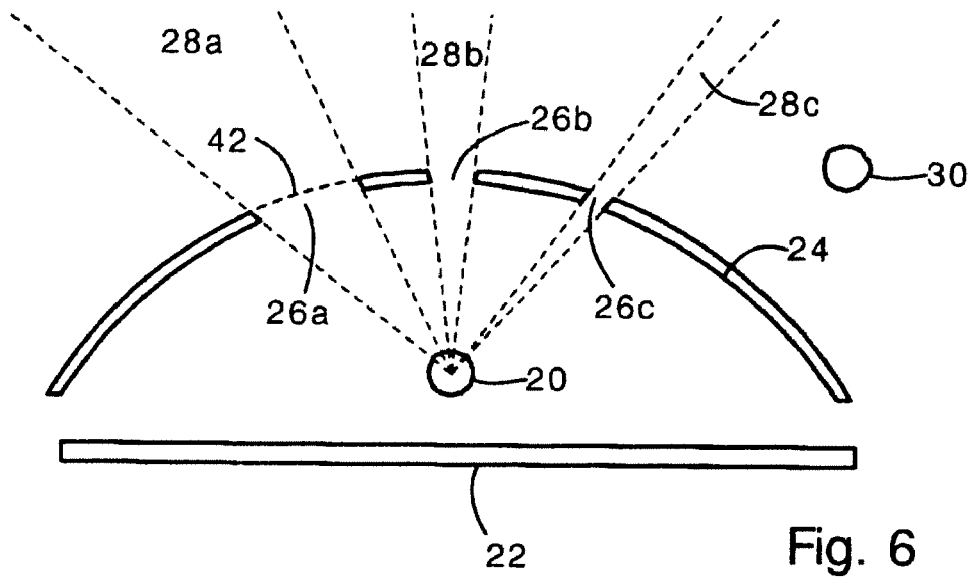
FIG. 6 illustrates an embodiment in which one window is covered with a metal screen.

In another aspect of the invention, the attenuator 24 is made of partially attenuating metal screens or foils with arrays of holes. In this embodiment, the holes or screen size can be tuned to attenuate certain frequencies. In this way, the antenna system can be tuned to receive signals from certain RFID tags (i.e., operating at certain frequencies), but not others. FIG. 6, for example, shows an embodiment in which a metal screen 42 is disposed over the large window 42. The metal screen 42 allows relatively high frequencies to pass, but will block relatively low frequencies.

Figure 7:
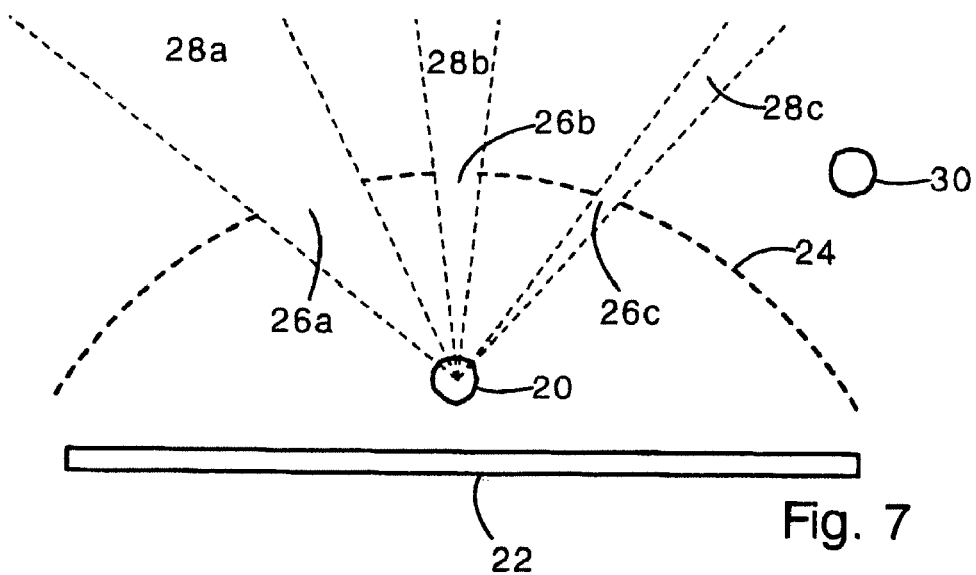
FIG. 7 illustrates an embodiment in which the attenuator is made of metal screen and does not completely block RFID tag signals.
Figure 8:
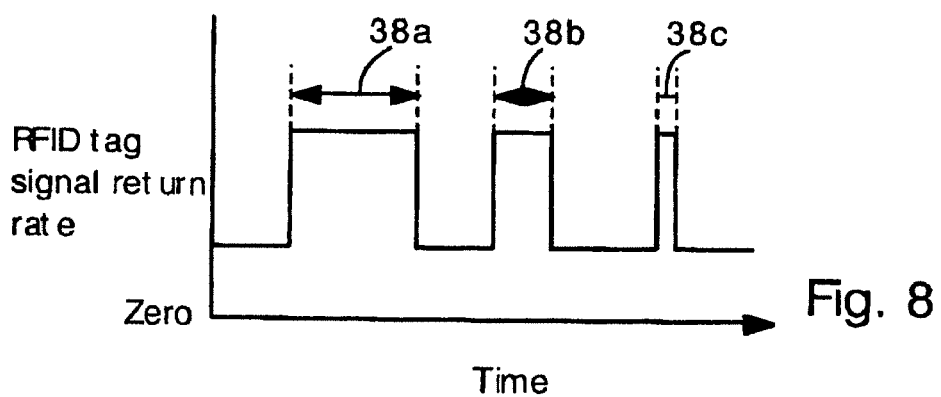
FIG. 8 illustrates the RFID tag signals received when the attenuator is made of metal screen that does not completely lock RFID tag signals.

FIG. 7 illustrates an embodiment in which the entire attenuator 24 is made of metal screen material with windows 26a 26b 26c. The metal screen material partially blocks RFID tag signals so that an RFID tag not aligned with the windows 26a 26b 26c will not be completely blocked. FIG. 8 illustrates the RFID tag signal return rate for a single tag moving along a conveyor belt. The RFID tag signal return rate does not drop to zero when the tag is not aligned with a window. This feature allows the antenna to monitor the RFID tags on the conveyor belt regardless of position.

Figure 9:
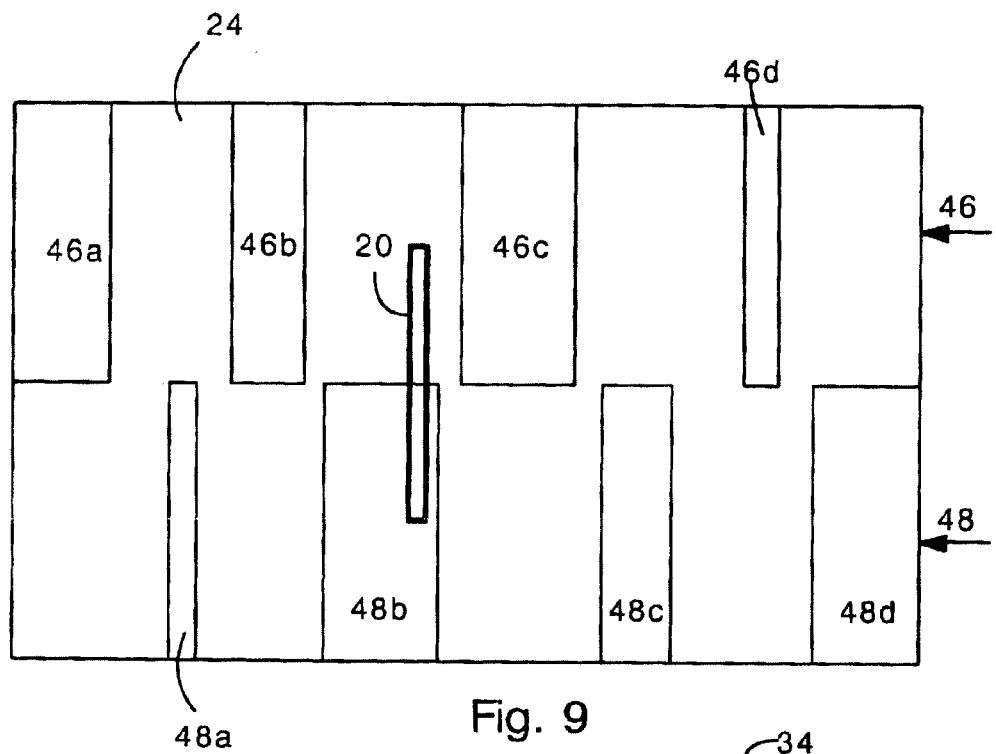
FIG. 9 shows a front view of an embodiment having vertical position detection capability.
Figure 10:
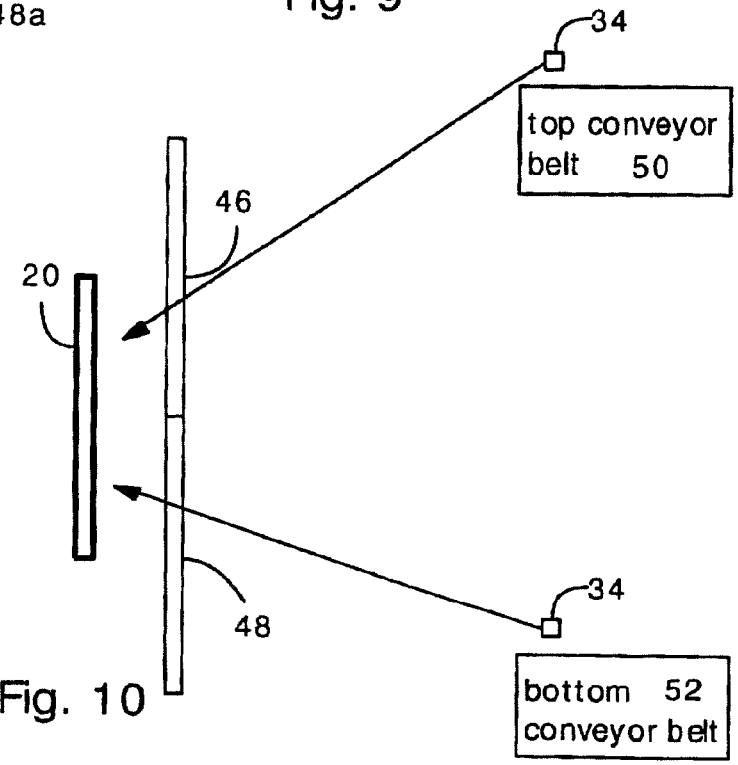
FIG. 10 shows a side view of the embodiment of FIG. 9.

It is noted that the present invention includes embodiments having attenuators with 2-dimensional window patterns. This will allow the antenna to monitor position and speed of tags traveling in 2 dimensions or at different heights. FIG. 9, for example, shows a front view of the dipole antenna 20 behind the attenuator 24. The attenuator 24 is a rectangular metal plate with a top row of windows 46a 46b 46c 46d, and a bottom row of windows 48a 48b 48c 48d. FIG. 10 shows a side view in combination with two conveyor belts 50 52 at different heights. Each of the windows in each row has a different width. This allows the determination of direction and position information of an RFID tag (if the RFID tag is moving). Since the top row of windows and the bottom row of windows are different, it is possible to determine whether the RFID tag is aligned with the top row or the bottom row (i.e. traveling on the top conveyor belt 50 or traveling on the bottom conveyor belt 52).

The present invention provides a simple and affordable single-antenna system for determining the position, speed and movement direction of an RFID tag. The present invention is well suited for use with conveyor belts or other situations where the RFID tag travels along a known and predictable pathway.

It will be clear to one skilled in the art that the above embodiment may be altered in many ways without departing from the scope of the invention. Accordingly, the scope of the invention should be determined by the following claims and their legal equivalents.

What is claimed is:

1. A method for detecting location of an RFID tag wherein said RFID tag is moving relative to said antenna, said method including steps of
   transmitting an interrogation signal to said RFID tag,
   generating a response signal from said RFID tag,
   detecting said response signal at an antenna through an area of reduced attenuation in a shield,
   determining a return rate of said response signal as said return signal is received through said area of reduced attenuation in said shield to approximate a rate of motion of said RFID tag relative to said antenna, and,
   if changes in said return rate do not have sharp boundaries, applying a threshold to said return rate.

2. The method as recited in claim 1 including the further step of
   moving said shield and said area of reduced attenuation relative to said antenna.

3. A method as recited in claim 1, including the further step of
   detecting another return signal from another RFID tag through a further area of reduced attenuation spaced from said area of reduced attenuation such that said detecting of said return signal from said RFID tag and said detecting of said another signal from said another RFID tag occur at different times.

* * * * *